United States Patent
Thiele et al.

(10) Patent No.: US 7,036,682 B2
(45) Date of Patent: May 2, 2006

(54) DESTACKING DEVICE FOR ICE-CREAM CONES

(75) Inventors: Werner Thiele, Mönchengladbach (DE); Jacques Delugeard, Maintenon (FR); Christian Jean-Marie Mange, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/814,636

(22) Filed: Apr. 1, 2004

(65) Prior Publication Data

US 2005/0111961 A1    May 26, 2005

Related U.S. Application Data

(63) Continuation of application No. 10/719,254, filed on Nov. 20, 2003, now abandoned.

(51) Int. Cl.
*B65H 3/28* (2006.01)
(52) U.S. Cl. .................. 221/221; 221/238
(58) Field of Classification Search .......... 221/221, 221/223, 232, 238
See application file for complete search history.

(56) References Cited

U.S. PATENT DOCUMENTS

| 1,623,353 | A | * | 4/1927 | McCarthy ............... 221/40 |
| 3,104,780 | A | * | 9/1963 | Carter et al. ............ 221/223 |
| 3,923,200 | A | | 12/1975 | Miller ..................... 221/221 |
| 4,327,843 | A | * | 5/1982 | Corley .................... 221/210 |
| 4,741,458 | A | * | 5/1988 | Odorici ................... 221/221 |
| 2005/0111960 | A1 | * | 5/2005 | Thiele et al. ........... 414/795.6 |

FOREIGN PATENT DOCUMENTS

WO    WO 99/44479    9/1999

* cited by examiner

*Primary Examiner*—Kenneth Noland
(74) *Attorney, Agent, or Firm*—Bell, Boyd & Lloyd LLC

(57) ABSTRACT

A destacking device for rolled cone-like structures with or without sleeves, and in particular for ice-cream wafer cones, has at least one gripper for the cones, with the jaws of the gripper that come into contact with the cones being made of an elastic material that conforms to the shape of the cone-like structures.

11 Claims, 3 Drawing Sheets

DESTACKING DEVICE FOR ICE-CREAM CONES

CROSS-REFERENCE TO RELATED APPLICATIONS

This application is a continuation of application Ser. No. 10/719,254 filed Nov. 20, 2003, now abandoned, the entire content of which is expressly incorporated herein by reference thereto.

FIELD OF THE INVENTION

The invention relates to a destacking device, with or without sleeves for handling rolled cone-like structures, in particular for ice-cream cones, wherein the device has a gripper system for the cones.

BACKGROUND OF THE INVENTION

A destacking device of the type mentioned in the introduction is required, in particular, for ice-cream production in which conically rolled comets or ice-cream wafers (referred to herein below as "cones" for short) are filled, in an ice-cream-filling machine, with the flavors of ice-cream envisaged therefore and are provided with suitable packaging. Known ice-cream-filling machines operate cyclically, in which case so-called trays each with six to twelve holders for cones are provided transversely to the running direction of the ice-cream-filling machine. The trays are processed simultaneously in one operation over the width of the six to twelve holders. In this case, the holders of a tray are first filled in each case with a conical wafer which is provided to receive and package the portion of ice cream which is to be produced. Six to twelve wafer cones then have to be carefully positioned at the same time in the conical packaging units. A chain conveyor then intermittently transports the tray with the six to twelve wafer cones and processes it further, in particular to fill the cones with one or more layers of the same or different flavors of ice-cream and then provides it with a closure cover.

Destacking devices are required for the abovementioned positioning of cones in the holders of a tray. Stacks of wafer cones inserted one inside the other are introduced manually in each case into the magazines of the destacking machine. From each stack, the lowermost cone then has to be separated and set down as carefully as possible in the associated holder of the tray which is to be filled. The performance requirements are at least around 30 to 60 cycles per minute and a reject rate (breakage) of less than or equal to one per thousand. Furthermore, the destacking device has to be capable of processing relatively large tolerances of the cones since these products are products made of natural ingredients which can also swell as a result of moisture absorption. For a cone top outer diameter of 42 mm, tolerances of ±2 mm typically are possible (with a cone length of approximately 105 mm).

As the cones are very fragile, the above-mentioned requirements are very difficult to achieve. Prior-art destacking devices available in the trade, for example, as described in U.S. Pat. No. 3,923,200, operate with rigid metallic grippers, which may comprise holding pins that retain the stack of cones and allow the lowermost end cone to drop when the tray holder is located beneath it. The gripping jaws are usually made of metal and protected by a soft material. In addition, the jaws have a small surface in contact with the wafer and they are not provided with a wafer or conical shape. In addition, they can present a hygienic risk. Also, the dropping action here results in a relatively high reject rate. Furthermore, there are problems with the centering of the cones in the holders. The motion of the grips is generally rotational and the mechanical assembly is rather complicated.

An alternative to rigid metallic jaws is proposed for Example in WO99/44479, which relates to a magazine for a dispenser for crisp fragile containers which comprises a tube with an elastically resilient membrane which is placed inside and whose internal volume is variable between a first position where it gently holds a wafer stack and a second position where it allows the free passage of the wafers through the tube for dispensing by blowing air between the tube and the membrane. From there, the wafers are taken over by jaws provided with resilient elements. This mechanism is of medium complexity and the reject rate is less.

In view of these disadvantages, improvements in such devices are desired and some particularly useful improvements are disclosed by the present invention.

SUMMARY OF THE INVENTION

The present invention preferably to an improvement in a destacking device that includes at least one gripper having a pair of jaws for handling a stack of rolled fragile structures, such as wafer cones for receiving ice cream or similar confectioneries. This improvement comprises making at least the portion of the jaws of the gripper that come into contact with the structures of an elastic material so that the structures can be handled and moved at high cycle rates with little or no breakage.

In a preferred embodiment, the jaws are formed essentially from a silicone or polyurethane material. Also, the jaws are preferably configured and adapted to conform to the structures or to the stack of such structures. Generally, the jaws have two lips that run parallel in a longitudinal direction and are arranged in a V-shaped manner transversely to the longitudinal direction, and are fastened in an easily exchangeable manner on a carrier.

In this device, at least one gripper is an individual gripper of a moveable design that is configured and operatively associated with the device to separate an end structure from the stack of such structures and move it to a discharge location. Also, at least one gripper is a stack gripper that grips the structures of the stack of structures except for the end structure. For optimum operation, the individual gripper and the stack gripper are connected to control means which is configured to cause the grippers to execute the following steps:

a) retaining the stack by the stack gripper and retaining an end structure of the stack by the individual gripper;
b) moving the individual gripper in order to separate the end structure as an individual structure from the stack and to transport it to a discharge location;
c) opening the individual gripper in order to set down the individual structure at the discharge location;
d) closing the individual gripper and moving it back to the stack;
e) opening the stack gripper in order to a low the stack to move further by one structure;
f) closing the stack gripper in order to retain the stack;
g) repeating steps a) to f), as necessary to remove all structures from the stack.

The destacking device also can include at least one nozzle which is directed onto an end of the stack and has a gas-supply line which expels a gas stream which assists the separation of the end structure from the stack. Also, the opening at the bottom of the jaws of the stack gripper can be provided with a reduction to assist in the separation of the end structure from the stack. Preferably, the jaws are configured in a three-dimensional shape made of a single block molding of elastic material for improving hygienic features of the device.

BRIEF DESCRIPTION OF THE DRAWINGS

The invention is explained by way of example hereinbelow with the aid of the figures, in which.

DETAILED DESCRIPTION OF THE PREFERRED EMBODIMENT

Figure 1:
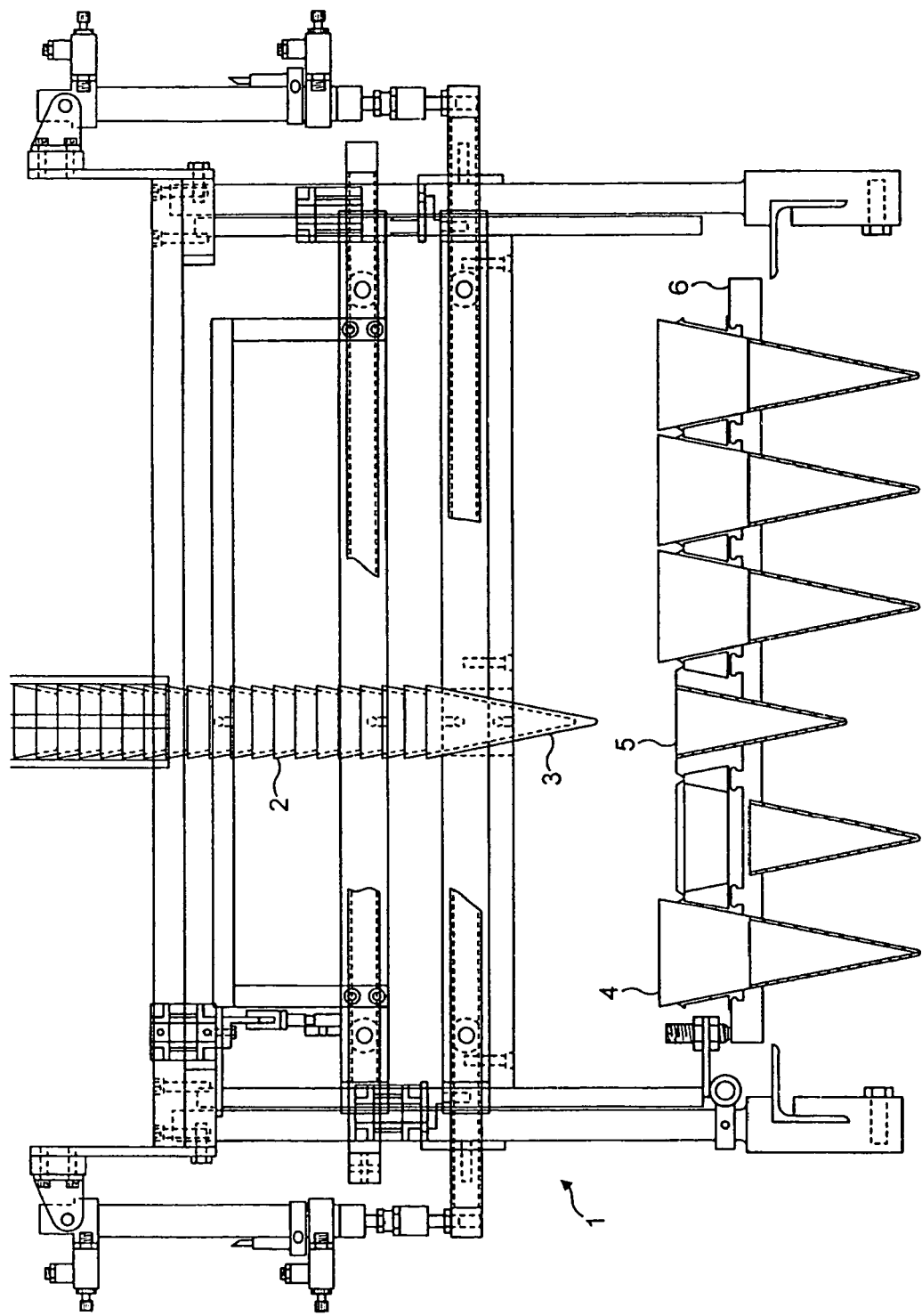
FIG. 1 shows a front view of a destacking device for cones (ice-cream wafers)

The present invention now provides an improved destacking device for rolled ice-cream cones with or without sleeves, in particular for ice-cream wafers, which, while maintaining higher cycle rates of at least 60 cycles per minute, causes only very little breakage of the cones during handling and movement. In addition, the destacking device is preferably intended to achieve good centering of the cones at their discharge location.

The destacking device according to the invention for rolled ice-cream cones has at least one gripper for the cones. A gripper has, by definition, two or more jaws, which can be moved relative to one another and, by moving together, can grip an article which is located between them. The destacking device is characterized in that the jaws of the gripper, which come into contact with the cones be made of or consist of an elastic material.

The elastic, i.e. compliant, design of the jaws of the gripper makes it possible to grip the ice-cream cones both securely and carefully. This increases the precision of the cone guidance, while, at the same time, fewer cones end up breaking. The elasticity of the material here should be selected to be suitable for the cones which are to be processed and the fragility thereof. The elasticity should be high enough (i.e. the elasticity constant should be low enough) for the maximum elastic forces which occur when the jaws of the gripper are moved together into the closed position, in the case of all cone sizes which are possible within the tolerance range, to remain below the breaking limit of the cones. On the other hand, the jaws should not be too flexible, this ensuring that the cones are fixed and positioned as precisely as possible in the gripper.

The most preferred materials for use in producing the jaws of the grippers are those that are hygienically compatible with the product being gripped. In particular, silicones or polyurethanes are preferably used for producing the jaws of the gripper. Furthermore, it is preferred if the jaws are profiled or shaped to correspond to the shape of the cones and/or the shape of the stack. This ensures secure gripping of the cones or of the stack and distribution of the contact force over the largest possible surface area, with the result that destructive stress peaks cannot occur at any point. In the case of the jaws with single block molding of elastic material, this will improve also the hygienic design of the equipment.

According to a preferred configuration, the jaws each have two lips which run parallel in their longitudinal direction and are located at an angle, i.e. arranged in a v-shaped manner, transversely to their longitudinal direction, with the result that it is possible for said jaws, by way of these lips, to position themselves against a cone or against a stack and to clamp the latter in carefully between the lips.

The jaws of the grippers are preferably fastened in an easily exchangeable manner on a carrier, as a result that, in the event of possible damage or wear, they can easily be replaced or, if the size of the processed cones changes, exchanged.

According to a development of the destacking device, the latter contains, as gripper, an individual gripper, which can be moved as a whole such that it can separate an end cone from the stack of cones and move it to a predetermined discharge location. In contrast to the known destacking devices for ice-cream wafers, the end cone, following separation from the stack, rather than simply being allowed to drop in the direction of the discharge location, is guided there in a defined manner, and set down at the target location, with the aid of the individual gripper. This reduces the breakage produced when the cone drops and, at the same time, results in better seating and in centering of the separated cone at the discharge location.

According to another development of the destacking device, the latter has, as gripper, a stack gripper which can grip the cones of a stack, apart from the end cone. Such a stack gripper can thus fix the stack which is located in the magazine of the device, the elastic design of the jaws of the stack gripper, despite the relatively large dimensional tolerances of the cones, allowing essentially all the cones to be gripped at the same time.

The destacking device provided with an individual gripper and a stack gripper may, furthermore, be connected to a control means, which is set up in order to make the two grippers execute the following steps:

a) retaining the stack of cones, with the exception of the end cone, by the stack gripper and retaining the end cone of the stack by the individual gripper;

b) moving the individual gripper in order to separate the end cone as an individual cone from the stack and to transport it to a predetermined discharge location;

c) opening the individual gripper in order to set down the individual cone at the discharge location;

d) closing the individual gripper and moving it back to the stack;

e) opening the stack gripper in order to allow the stack to move further by one cone;

f) closing the stack gripper in order to retain the stack in the new position;

g) repeating steps a) to f).

Such a destacking device allows the cyclic operation which is required of known ice-cream-filling machines, the interaction of the stack gripper and individual gripper resulting in extremely careful and, at the same time, precise handling of the cones.

The device according to the invention, furthermore, may be developed in that it contains at least one nozzle which is directed towards the end of the stack and has a gas-supply line which can expel a gas stream (preferably compressed air at approximately 3 bar) which assists the separation of the end cone from the stack.

FIG. 1 shows a front view of part of a destacking device 1 for conical ice-cream wafers (referred to herein below as "cones"). In this destacking device, a stack 2 of cones, which have been inserted one inside the other is guided in a magazine which is formed from three vertical rods arranged in a triangle. The cones are to be inserted into the holders 5 of a tray 6. The holders here have already been filled with conical paper packaging units 4 beforehand.

Figure 2:
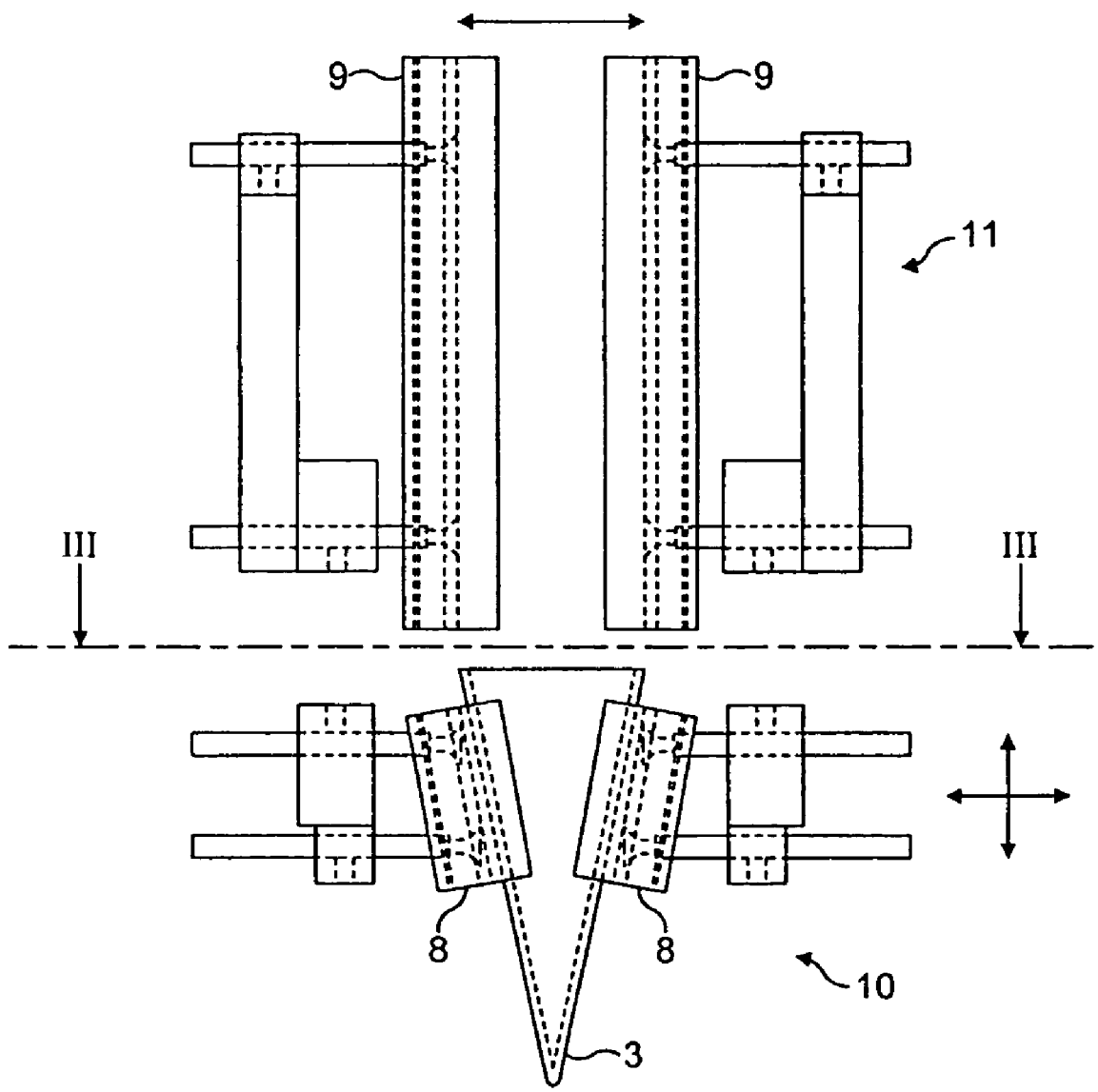
FIG. 2 shows a side view of the grippers of a destacking device according to the invention.
Figure 4:
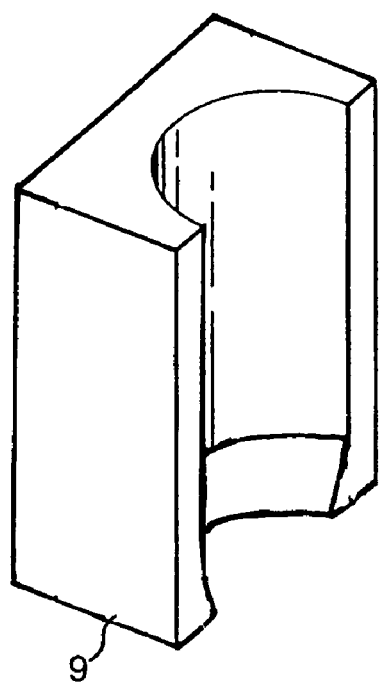
FIG. 4 shows a perspective view of an upper jaw.

FIG. 2 shows a side view of the grippers 10, 11, which are essential to the invention, of the destacking device 1 in an arrangement in which they are ready for operation, the rest of the parts of the device having been left out. It is possible to see a top, stack gripper 11 with two mirror-inverted gripper arms, which can be moved relative to one another in the horizontal direction (double arrow) in order to be able to accommodate and retain a stack of cones (not illustrated) between them. The upper jaws 9 (FIG. 4) of the stack gripper 11 which come into contact with the stack are formed by elongate, profiled elements made of an elastic polymer material, for example silicone or polyurethane. As noted above, these can be formed as a molded block. As shown in FIG. 4, there is a reduction of the diameter to obtain good separation of the last cone without the risk of picking up two cones at the same time. Also, the reduction of the opening at the bottom of the jaws of the stack gripper assists in the separation of the end structure from the stack.

Figure 5:
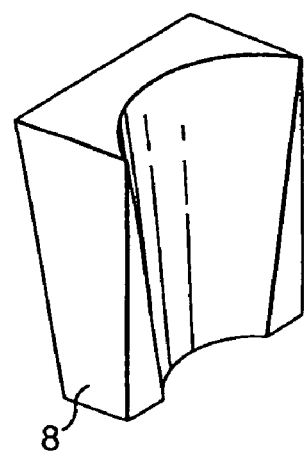
FIG. 5 shows a perspective view of a lower jaw.

Located beneath the stack gripper 11 is an individual gripper 10, which differs from the stack gripper 11 essentially in that its vertical extent is very much shorter, and in that its elastic jaws 8 (FIG. 5) are arranged obliquely and such that they taper conically in relation to one another in accordance with the cone angle of the cones. By means of the jaws 8, the individual gripper 10 can grip the lowermost, end cone 3 of a stack and separate it from the rest of the stack since (only) this lowermost cone 3 is not secured by the stack gripper 11.

The jaws 8 and 9 can be moved apart from one another in each case, for example, via a pneumatic spreading mechanism, with the result that the wafers can be either packaged or released. This can take place, in particular, via universal-jointed rods, which are fastened on a pneumatic piston.

Figure 3:
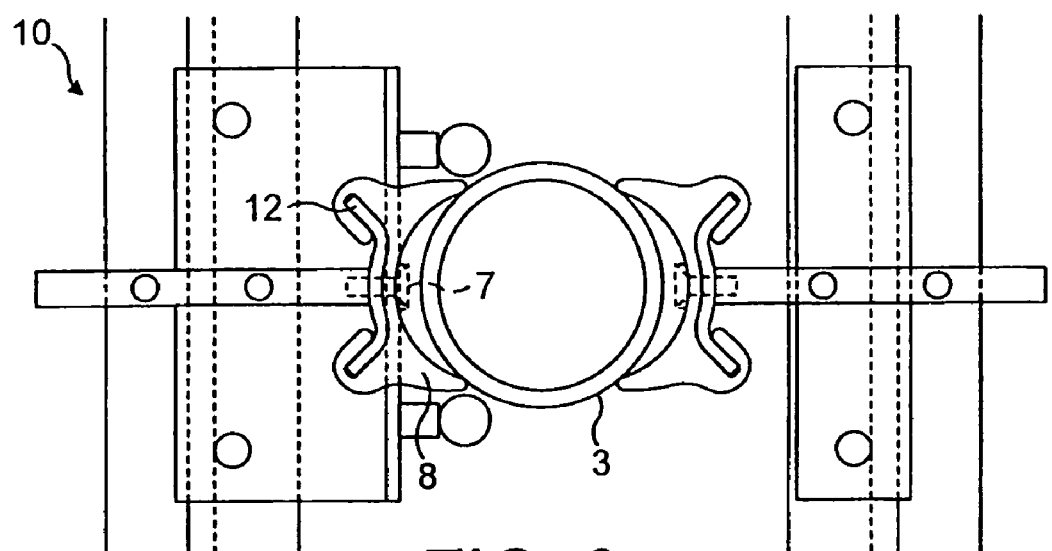
FIG. 3 shows a section along line III—III from FIG. 2 with a plan view of the individual gripper.

FIG. 3 illustrates the individual gripper 10 in a plan view (line III—III from FIG. 2). The profiled jaws 8, which are adapted to the shape of an ice-cream cone 3, are clearly visible here. The jaws 8 each have two lips, which are located at an angle, in a V-shaped manner, in relation to one another and can be deformed elastically in the outward direction, in order to compensate for tolerances of the cones 3. The elasticity and flexibility of the material of the jaws 8 cause the latter to engage in optimum fashion in the wafer pattern of the cones 3. As a result of their elasticity, adherence and good ability to fit closely, coordinated with the cones 3, the jaws 8 and 9 allow the cones 3 to be gripped securely without slippage and without being broken by excessive forces. Also, by configuring the jaws in a three-dimensional shape made of a single block molding of elastic material, hygienic features and operation of the device are facilitated, as there are no crevices, joints or other points of connection between the jaws and the operating structure that come in contact with the cone where particles or bacteria can collect or grow.

It can also be seen from FIG. 3 that the jaws 8 are clamped on a metal rail 12, which is curved in undulating fashion and, for its part, is fastened on the rest of the arm structure by means of a screw 7. It is thus possible for the jaws to be easily adjusted and, if required, also exchanged.

An operating cycle of the destacking device 1 proceeds essentially as follows:

A stack 2 of cones is located in the vertical magazine. In order to perform a reset function, first of all the jaws 9 of the stack gripper 11 are opened, while the individual gripper 10 is closed. The stack gripper 11 is activated such that the stack 2 of the wafer cones is secured, apart from the lowermost, end cone 3. This concludes the reset operation.

The actual lowering operation of the end cone 3 is triggered, via the chain with the holders 5, at the pulse of a proximity switch, if the holders 5 are in the appropriate position and remain there. At this moment, the individual gripper 10 moves downwards, with the result that the separated cone 3 is conveyed to a level just above the holder 5 of the tray 6. The individual gripper 10 is then opened by virtue of the jaws 8 being moved apart from one another, and the cone 3 drops a short distance, typically of 40 to 50 mm, into the holder. The ice-cream cone is additionally braked by the air cushion, which is produced in the conical packaging just before the end position is reached. Since the dropping distance is very small in relation to the prior-art dropping height, there is barely any breakage, and the cones, in addition, are seated with good centering in the holders.

Following opening of the individual gripper 10, the latter is guided upwards again to the bottom end of the stack 2 and is closed again by virtue of the jaws 8 being moved together. The stack gripper 11 is then opened some way by virtue of the jaws 9 being moved apart from one another, with the result that the stack 2 can slip down and the cone, which is now at the end can pass into the individual gripper 10. The above-described operation can then be executed anew. This means that the required cycle rates of 60/min can be reached without difficulty, it being possible for the operation to proceed with overall time control, triggered by the holder chain.

In order to assist the separation of the cones from the stack 2, it is further possible for two nozzles (not illustrated) to blow an air stream laterally from above into the cone 3 which is to be separated, in order, for example, to prevent the situation where the cone located there above is also withdrawn, despite the retaining forces of the stack gripper 11, or where the separated cone slides off the individual gripper again.

Exchanging the jaws 8, 9 and/or the grippers 10, 11 as a whole allows the destacking device to be easily adapted, if required, to other dimensions of cone.

What is claimed is:

1. In a destacking device that includes at least one gripper having a pair of jaws for handling a stack of rolled fragile structures with or without sleeves, the improvement which comprises making at least the portion of the jaws of the gripper that come into contact with the structures of an elastic material so that the structures can be handled and moved at high cycle rates with little or no breakage, wherein at least one gripper is an individual gripper of a moveable desing that is configured and operatively associated with the device to separate an end structure from the stack of such structures and move it to a discharge location and wherein at least one gripper is a stack gripper that grips the structures of the stack of structures except for the end structure.

2. The destacking device of claim 1, wherein the jaws are formed essentially from a silicone or polyurethane material.

3. The destacking device of claim 1, wherein the jaws are configured and adapted to conform to the structures or to the stack of such structures.

4. The destacking device of claim 1, wherein the jaws have two lips which run parallel in a longitudinal direction and are arranged in a V-shaped manner transversely to the longitudinal direction.

5. The destacking device of claim 1, wherein the jaws are fastened in an easily exchangeable manner on a carrier.

6. The destacking device of claim 1, wherein the individual gripper and the stack gripper are connected to control means which is configured to cause the grippers to execute the following steps: a) retaining the stack by the stack gripper and retaining an end structure of the stack by the individual gripper; b) moving the individual gripper in order to separate the end structure as an individual structure from the stack and to transport it to a discharge location; c) opening the individual gripper in order to set down the individual structure at the discharge location; d) closing the individual gripper and moving it back to the stack; e) opening the stack gripper in order to a low the stack to move further by one structure; f) closing the stack gripper in order to retain the stack; g) repeating steps a) to f), as necessary to remove all structures from the stack.

7. The destacking device of claim 1, wherein the opening at the bottom of the jaws of the stack gripper is provided with a reduction which assists in the separation of the end structure from the stack.

8. The destacking device of claim 1, which includes at least one nozzle which is directed onto an end of the stack and has a gas-supply line which expels a gas stream which assists the separation of the end structure from the stack.

9. The destacking device of claim 1, wherein the jaws are configured in a three-dimensional shape made of a single block molding of elastic material for improving hygienic features of the device.

10. The destacking device of claim 1, wherein the structures are wafer cones that are intended to receive ice cream or similar confectioneries.

11. The destacking device of claim 1, wherein the structures are handled and moved at around 60 cycles per minute with a reject or breakage rate that is less than or equal to one structure per thousand structures handled.

* * * * *